(12) United States Patent
Rozman et al.

(10) Patent No.: US 10,483,886 B2
(45) Date of Patent: Nov. 19, 2019

(54) MODULAR ELECTRIC POWER GENERATING SYSTEM WITH MULTISTAGE AXIAL FLUX GENERATOR

(71) Applicant: Hamilton Sundstrand Corporation, Charlotte, NC (US)

(72) Inventors: Gregory I. Rozman, Rockford, IL (US); Jacek F. Gieras, Glastonbury, CT (US); Steven J. Moss, Rockford, IL (US)

(73) Assignee: HAMILTON SUNDSTRAND CORPORTION, Charlotte, NC (US)

( * ) Notice: Subject to any disclaimer, the term of this patent is extended or adjusted under 35 U.S.C. 154(b) by 71 days.

(21) Appl. No.: 15/704,531

(22) Filed: Sep. 14, 2017

(65) Prior Publication Data
US 2019/0081582 A1 Mar. 14, 2019

(51) Int. Cl.
*H02P 9/00* (2006.01)
*H02H 7/06* (2006.01)
(Continued)

(52) U.S. Cl.
CPC .............. *H02P 9/006* (2013.01); *B60L 50/10* (2019.02); *B60L 50/12* (2019.02); *B60L 50/13* (2019.02);
(Continued)

(58) Field of Classification Search
CPC .. H02P 9/006; H02P 2103/20; H02P 2201/03; H02H 7/062; H02K 7/1807;
(Continued)

(56) References Cited

U.S. PATENT DOCUMENTS 4,927,329 A * 5/1990 Kliman ............... F01D 7/00
416/127
5,083,039 A * 1/1992 Richardson ........... F03D 7/0272
290/44
(Continued)

FOREIGN PATENT DOCUMENTS

EP 0743215 A2 11/1996

OTHER PUBLICATIONS

US Patent Application 96066US01 Electric Power Generating System with Permanent Magnet Generator, Filed Sep. 28, 2016. Hamilton Sundstrand Corporation.
(Continued)

*Primary Examiner* — Tulsidas C Patel
*Assistant Examiner* — Joseph Ortega
(74) *Attorney, Agent, or Firm* — Carlson, Gaskey & Olds, P.C.

(57) ABSTRACT

An example electrical power system includes a DC bus connected to a load, a plurality of generators driven by rotation of a common shaft, and a plurality of power converters. Each power converter includes an active rectifier controller that operates a respective active rectifier to rectify AC from a respective one of the generators to DC on the DC bus. A load sharing controller is operable to provide a respective adjustment signal to each respective power converter that is enabled, the respective adjustment signals based on a difference between an average output current across all of the active rectifiers that are enabled, and a particular output current of the respective power converter. Each active rectifier controller is operable to determine a quadrature current value for its associated generator based on its adjustment signal.

20 Claims, 9 Drawing Sheets

(51) Int. Cl.
  *H02K 16/00* (2006.01)
  *H02K 21/24* (2006.01)
  *H02K 7/18* (2006.01)
  *H02M 7/23* (2006.01)
  *H02M 7/217* (2006.01)
  *H02M 5/458* (2006.01)
  *H02J 3/46* (2006.01)
  *H02J 7/14* (2006.01)
  *H02K 16/04* (2006.01)
  *B60L 50/10* (2019.01)
  *B60L 50/12* (2019.01)
  *B60L 50/13* (2019.01)
  *H02P 103/20* (2016.01)
  *H02J 1/10* (2006.01)

(52) U.S. Cl.
  CPC .............. *H02H 7/062* (2013.01); *H02J 3/46* (2013.01); *H02J 7/1423* (2013.01); *H02K 7/1807* (2013.01); *H02K 16/00* (2013.01); *H02K 16/04* (2013.01); *H02K 21/24* (2013.01); *H02M 5/4585* (2013.01); *H02M 7/2173* (2013.01); *H02M 7/23* (2013.01); *H02J 2001/106* (2013.01); *H02J 2007/143* (2013.01); *H02P 2103/20* (2015.01); *H02P 2201/03* (2013.01)

(58) Field of Classification Search
  CPC ..... H02K 16/00; H02K 21/24; H02M 7/2173; H02M 7/23
  See application file for complete search history.

(56) References Cited

U.S. PATENT DOCUMENTS

| | | | |
|---|---|---|---|
| 5,318,142 A | 6/1994 | Bates et al. | |
| 6,198,238 B1* | 3/2001 | Edelson | H02K 3/28 318/148 |
| 7,282,886 B1 | 10/2007 | Patel et al. | |
| 7,960,948 B2 | 6/2011 | Saban et al. | |
| 8,115,446 B2 | 2/2012 | Piccard et al. | |
| 8,461,732 B2 | 6/2013 | Gieras et al. | |
| 8,908,336 B2 | 12/2014 | Cullen et al. | |
| 9,059,647 B2 | 6/2015 | Rozman et al. | |
| 9,705,440 B2* | 7/2017 | Rozman | H02P 9/48 |
| 9,985,305 B2* | 5/2018 | Kaneko | H01M 8/0488 |
| 10,218,296 B1* | 2/2019 | Okubayashi | H02P 6/183 |
| 10,293,693 B2* | 5/2019 | Kim | H02J 7/0021 |
| 2007/0108771 A1* | 5/2007 | Jones | H02P 9/102 290/44 |
| 2007/0121354 A1* | 5/2007 | Jones | H02M 5/4585 363/47 |
| 2007/0216343 A1* | 9/2007 | Rozman | H02M 1/12 318/811 |
| 2008/0238108 A1* | 10/2008 | Edelson | B60W 10/06 290/400 |
| 2009/0067202 A1* | 3/2009 | Ichikawa | B60L 15/2045 363/79 |
| 2009/0145675 A1* | 6/2009 | Ichikawa | B60L 58/20 180/65.1 |
| 2009/0186535 A1* | 7/2009 | Sullivan | B60F 3/0007 440/6 |
| 2010/0244599 A1* | 9/2010 | Saban | H02K 3/28 310/71 |
| 2013/0077194 A1* | 3/2013 | Hasan | H02H 7/00 361/31 |
| 2013/0147412 A1* | 6/2013 | Solodovnik | H02H 7/125 318/454 |
| 2013/0300243 A1* | 11/2013 | Gieras | H02K 21/046 310/156.43 |
| 2013/0313828 A1* | 11/2013 | Moreau | H02K 19/28 290/44 |
| 2014/0191606 A1* | 7/2014 | Gieras | H02K 19/22 310/112 |
| 2015/0097432 A1* | 4/2015 | Gurin | H02P 9/008 307/31 |
| 2015/0130376 A1* | 5/2015 | Pace | H02P 21/0089 318/400.02 |
| 2016/0111993 A1 | 4/2016 | Maloum et al. | |
| 2016/0308423 A1* | 10/2016 | Rozman | H02K 11/33 |
| 2016/0329851 A1* | 11/2016 | Borisov | H02P 21/50 |
| 2017/0141633 A1* | 5/2017 | Atalla | H02K 11/25 |
| 2017/0163114 A1* | 6/2017 | Gieras | H02K 3/28 |
| 2017/0353135 A1* | 12/2017 | Dutta | H02P 9/36 |
| 2018/0015831 A1* | 1/2018 | Rozman | B60L 1/003 |
| 2018/0019699 A1* | 1/2018 | Zaimeddine | H02P 21/24 |
| 2018/0072158 A1* | 3/2018 | Yang | B60K 6/48 |
| 2018/0079515 A1* | 3/2018 | Harwood | H02J 7/34 |
| 2018/0131290 A1* | 5/2018 | Ng | H02M 7/501 |
| 2018/0164362 A1* | 6/2018 | Premerlani | G01R 19/0092 |
| 2018/0287526 A1* | 10/2018 | Iwaji | H02P 6/21 |
| 2018/0348308 A1* | 12/2018 | Zhang | H02J 3/383 |

OTHER PUBLICATIONS

US Patent Application 95728US01 "Electric Power Generating System with a Synchronous Generator," Filed Aug. 16, 2016. Hamilton Sundstrand Corporation.
U.S. Appl. No. 15/236,890. "Active Rectifier Topology", filed Aug. 15, 2016. Hamilton Sundstrand Corporation.
U.S. Appl. No. 15/207,901. "Integrated Modular Electric Power System for a Vehicle," filed Jul. 12, 2016. Hamilton Sundstrand Corporation.
European Search Report for European Patent Application No. 18194612.0 completed Oct. 17, 2018.

* cited by examiner

MODULAR ELECTRIC POWER GENERATING SYSTEM WITH MULTISTAGE AXIAL FLUX GENERATOR

BACKGROUND

The present disclosure relates to electrical power systems, and more particularly to a modular electrical power system that incorporates a multistage axial flux generator whose stages are driven by rotation of a common shaft.

Reliability in power delivery is important in many vehicles, such as military ground vehicles, which must be suitable for combat operations. A typical military ground vehicle may include a plurality of electrical generators that power a load over a bus. Certain operating conditions may cause unpredictable conditions on the bus, such as the failure of a generator, or uneven load distribution.

SUMMARY

An example electrical power system includes a direct current (DC) bus connected to a load, a plurality of generators driven by rotation of a common shaft, and a plurality of power converters. Each power converter includes an active rectifier controller that operates a respective active rectifier to rectify alternating current (AC) from a respective one of the generators to DC on the DC bus. A load sharing controller is operable to provide a respective adjustment signal to each respective power converter that is enabled, the respective adjustment signals based on a difference between an average output current across all of the active rectifiers that are enabled, and a particular output current of the respective power converter. Each active rectifier controller is operable to determine a quadrature current value for its associated generator based on its adjustment signal. A method of operating an electrical power system is also disclosed.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Of the many types of electrical generators, synchronous permanent magnet generators (PMGs), such as axial flux PMGs or radial flux PMGs, are well-suited for use in military ground vehicles due to their high efficiency and power density. Of these two types of synchronous PMGs, axial flux PMGs offer higher power density, efficiency, and compact multistage structure in comparison with radial flux PMGs.

Figure 1A:
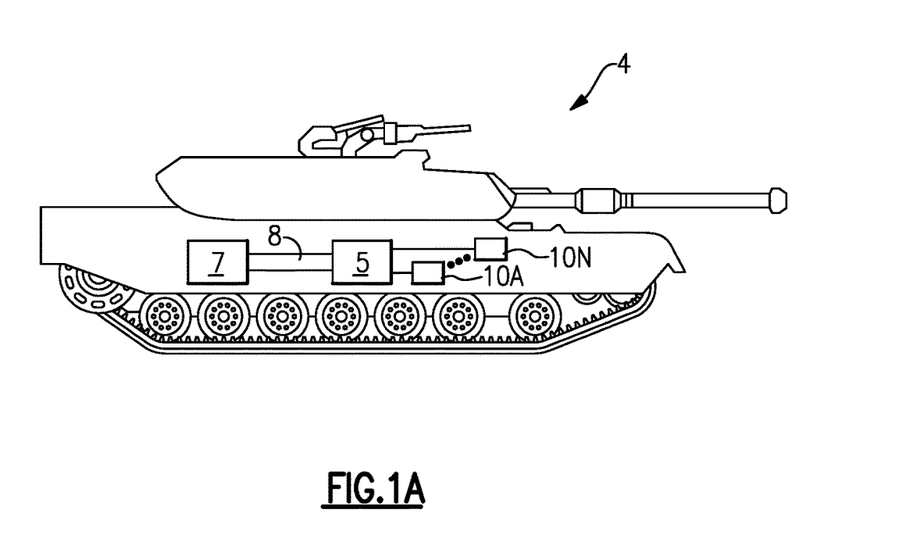
FIG. 1A is a schematic view of a military ground vehicle incorporating a multistage permanent magnet generator whose stages are driven by a common shaft.

FIG. 1A is a schematic view of a military ground vehicle 4 that includes a multistage axial flux PMG 5. The vehicle 4 also includes a prime mover engine 7 (e.g., a diesel or gas turbine engine) that rotates a common shaft 8 to drive operation of the axial flux PMG 5. Each stage of the axial flux PMG 5 is coupled to a respective power converter 10A-N that converts AC from its generator stage to DC. Although the vehicle 4 is depicted as a tank, it is understood that this is only an example, and that other vehicles could be used (e.g., an automobile or underwater vehicle).

Figure 1B:
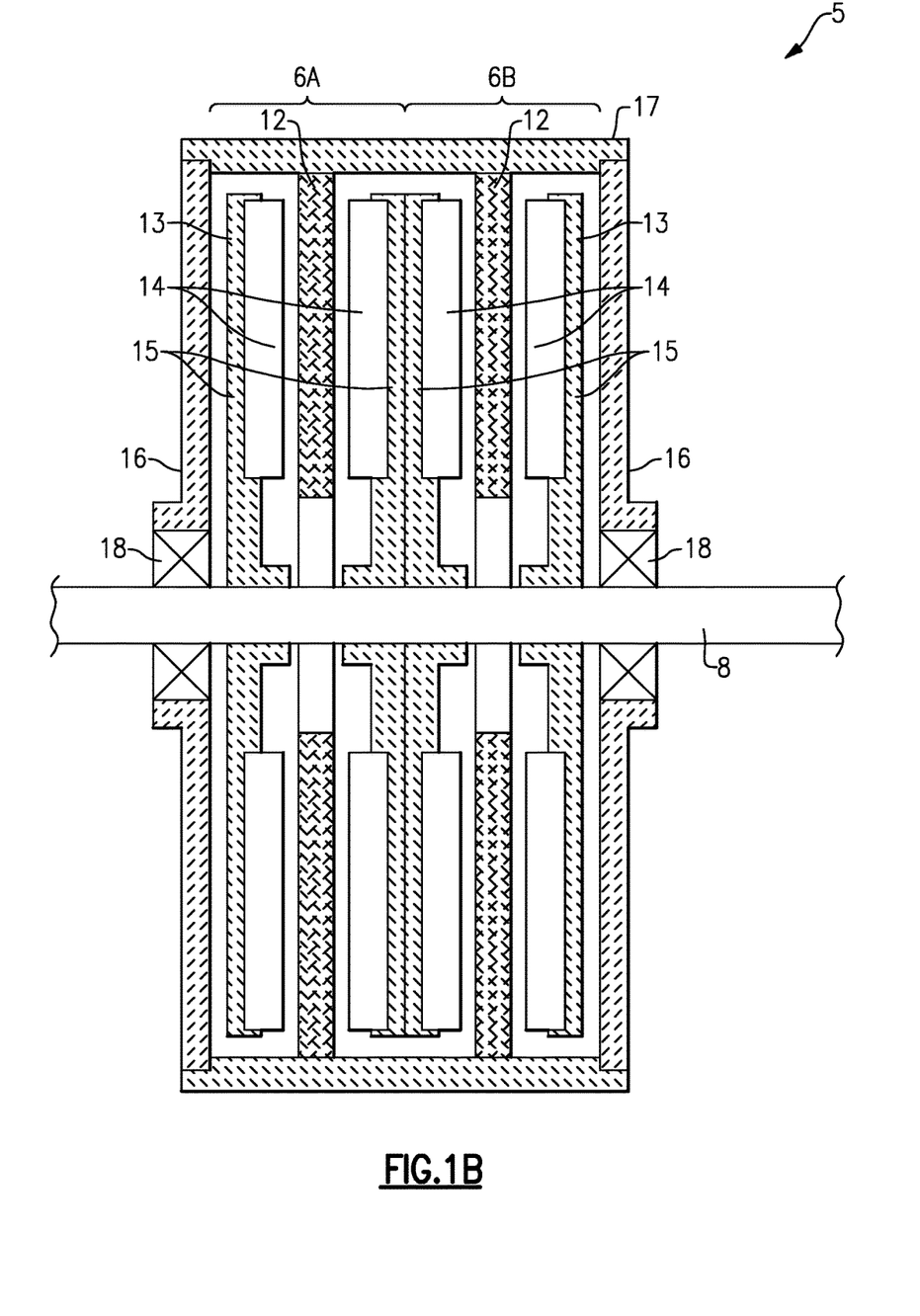
FIG. 1B is a schematic view of a plurality of an example multistage axial flux permanent magnet generator.

FIG. 1B is a schematic view of an example multistage axial flux PMG 5 having a plurality of generator stages 6A-B that are driven by the common shaft 8. Each generator stage 6A-B includes a stator 12, and a rotor 13 that rotates permanent magnets 14. Steel disks 15 separate the generator stages 6 from each other. A housing is formed by end bells 16 and a cylindrical outer portion 17. Bearings 18 facilitate rotation of the shaft 8. The generator stages 6A-B are modular, and if they malfunction they can be disabled and replaced in a modular fashion. Although only two generator stages 6A-B are shown in FIG. 1 (which collectively include two stator blocks 12 and three rotor blocks 13, it is understood that other quantities of generator stages 6 could be used (e.g., 3-20).

Figure 2:
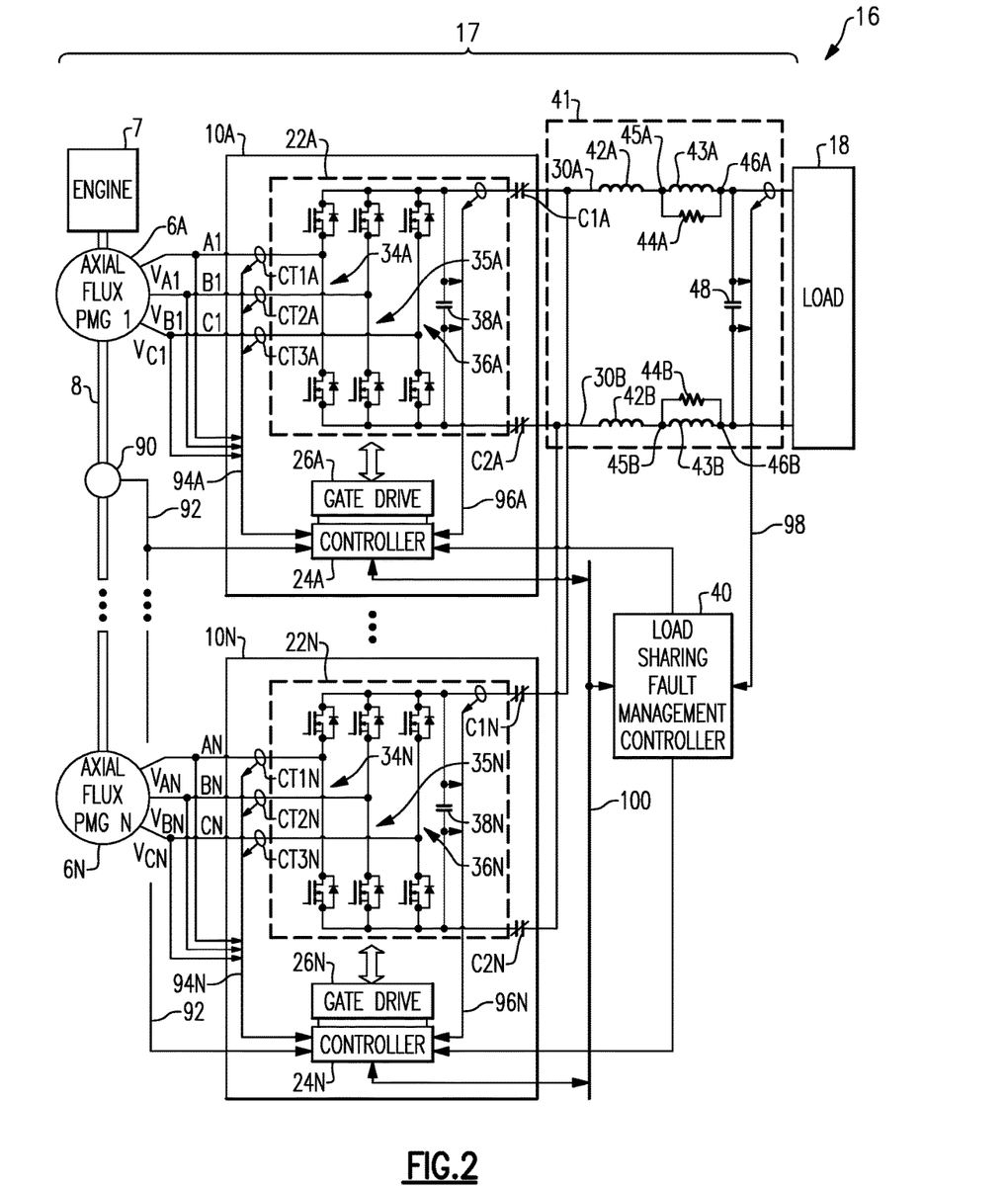
FIG. 2 is a schematic view of an example electrical power system.

FIG. 2 is a schematic view of an example electrical power system 16 that may be incorporated into a vehicle, such as the military ground vehicle 4. The electrical power system 16 includes a power generating section 17 and a DC load 18. The power generating section 17 includes a plurality of generator stages 6A-N, prime mover engine 7, a plurality of modular power converters 10A-N, a load sharing/fault management controller 40, and an output filter 41. The prime mover engine 7 rotates the common shaft 8 that drives operation of the generator stages 6A-N.

Each generator stage 6 has a plurality of stator windings (shown schematically as 12 in FIG. 1) that provide a plurality of phases of current on respective output lines A, B, C. Thus, generator stage 6A has stator winding outputs A1, B1, C1, and generator stage 6N has stator winding outputs AN, BN, CN. The stator windings serve as boost inductors during active rectifier 22 operation.

Each power converter 10A-N is associated with a given one of the generator stages 6A-N and includes a respective active rectifier 22, active rectifier controller 24, and gate drive 26.

A DC bus includes a positive rail 30A and a negative rail 30B (collectively DC bus 30) that connect the outputs of the active rectifiers 22 to the DC load 18. The plurality of active rectifiers 22 are connected in parallel to each other on the DC bus 30.

As will be discussed below in greater detail, the electrical power system 16 provides coordination between the various generator stages 6 to supply load power demand, maintain DC bus 30 voltage within specification requirements, and compensate active rectifier 22 losses. In addition, the electrical power system 16 provides for disconnecting faulty ones of the generator stages 6 and reconfiguring the remaining enabled active rectifiers 22 using corrective signals and a phase shifted carrier signal. The carrier signals used by each power converter 10 are phase shifted from each other by T/N where T is a period of the carrier signal and N is a quantity of the active rectifiers 22 that are enabled.

The active rectifiers 22 rectify AC from their associated generator stages 6 to DC on the DC bus 30. In particular, each active rectifier controller 24 utilizes its gate drive 26 to perform pulse width modulation on the switches S1-S6 of its active rectifier 22. In some examples, the active rectifier controllers 24 use an interleaved technique that facilitates a reduced power rating of each active rectifier 22, a reduced size of the output filter 41, and a scalable modular design.

The example active rectifiers 22 shown in FIG. 2 are 2-level pulse width modulated power converters. However, it is understood that other topologies, such as multilevel power converters can be utilized instead.

Figure 3:
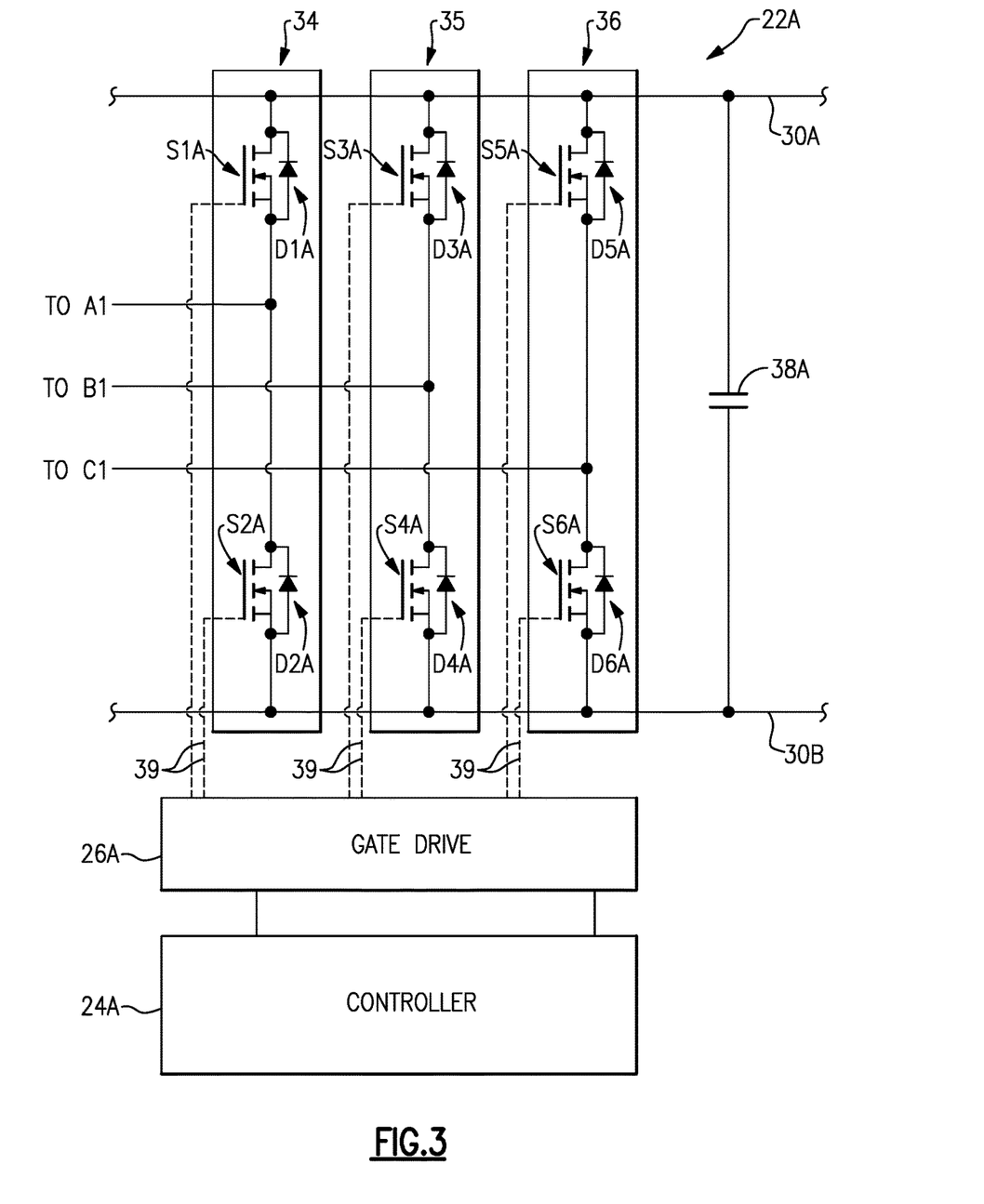
FIG. 3 is a schematic view of an active rectifier from the system of FIG. 2.

Active rectifier 22A is illustrated in more detail in FIG. 3. The active rectifier 22A has a plurality of switching legs, 34, 35, 36, each of which controls connection of a respective one of the winding outputs A1, B1, C1 to the DC bus 30. Switching leg 34 includes power switches S1A, S2A; switching leg 35 includes power switches S3A, S4A; and switching leg 36 includes power switches S5A, S6A. Each of the power switches S1A, S3A, S5A has a node that connects to the positive rail 30A of the DC bus 30. Each of the power switches S2A, S4A, S6A has a node that connects to the negative rail 30B of the DC bus 30. Each of the power switches S1A-S6A also has a node that connects to its respective winding output A1, B1, C1. Each power switch S1A-S6A also has an associated freewheeling diode D1A-D6A that forms a current path when its respective power switch S1A-S6A is turned OFF.

The active rectifier controller 24A operates gate drive 26A to control the switches S1A-S6A over control lines 38. Although the power switches S1A-S6A are shown as being metal-oxide semiconductor field-effect transistors (MOS-FETs) in FIG. 3, it is understood that other types of switches could be used, such as insulated-gate bipolar transistors (IGBTs).

Each active rectifier 22 also includes a DC link capacitor 38 that is connected across the DC bus 30.

Referring again to FIG. 2, each active rectifier 22 has pair of associated contactors C1, C2 that can be used to disconnect from the positive rail 30A and the negative rail 30B of the DC bus 30. In one example, the contactors C1, C2 are commanded to disable their associated active rectifier 22 by disconnecting the active rectifier 22 from the DC bus 30 if their associated generator stage 6 experiences a fault condition.

In an alternative embodiment (not shown), each contactor C1 is replaced with a diode that permits current flow from active rectifier 22 onto the positive rail 30A, but prevents current from flowing in the reverse direction from the positive rail 30A back to the active rectifier 22. Use of such a diode can improve power density in some examples.

The load sharing/fault detection controller 40 is in communication with the individual active rectifier controllers 24, and is operable to detect a fault condition occurring in any of the generator stages 6. Upon detection of such a condition, the controller 40 commands the active rectifier 22 associated with the faulty generator stage 6 to disconnect from the DC bus 30 (e.g., by opening contactors C1, C2), and adjusts its respective corrective signals that are provided to each active rectifier 22. In the event of a fault condition that causes a generator stage 6 to be disabled, the phase shifting of the carrier signal among the remaining enabled active rectifiers 22 is also adjusted.

The controller 40 provides a load sharing feature among the various active rectifiers 22 by providing its respective corrective signals. For example, if there are five active rectifiers 22 and one must be disabled, then the controller 40 can adjust the corrective signals so that the remaining non-disabled active rectifiers 22 still maintain a desired voltage on the DC bus 30. In some examples, the controller performs a load balancing that evenly balances a load among the non-disabled active rectifiers 22.

The output filter 41 is shared by the plurality of active rectifiers 22A-N. The output filter 41 is situated on the DC bus 30 between the load 18 and the plurality of active rectifiers 22A-N. On each of the positive rail 30A and negative rail 30B of the DC bus 30, the output filter 41 includes a pair of inductors 42, 43. Inductor 43 is connected in parallel with a respective resistor 44 between two nodes 45, 46. Inductor 42 is connected in series to node 45. A filter capacitor 48 is connected across the DC bus 30 between the nodes 46A-B. The output filter 41 minimizes voltage ripple on the DC bus 30 and provides for stable operation in the presence of constant power loads.

Figure 4:
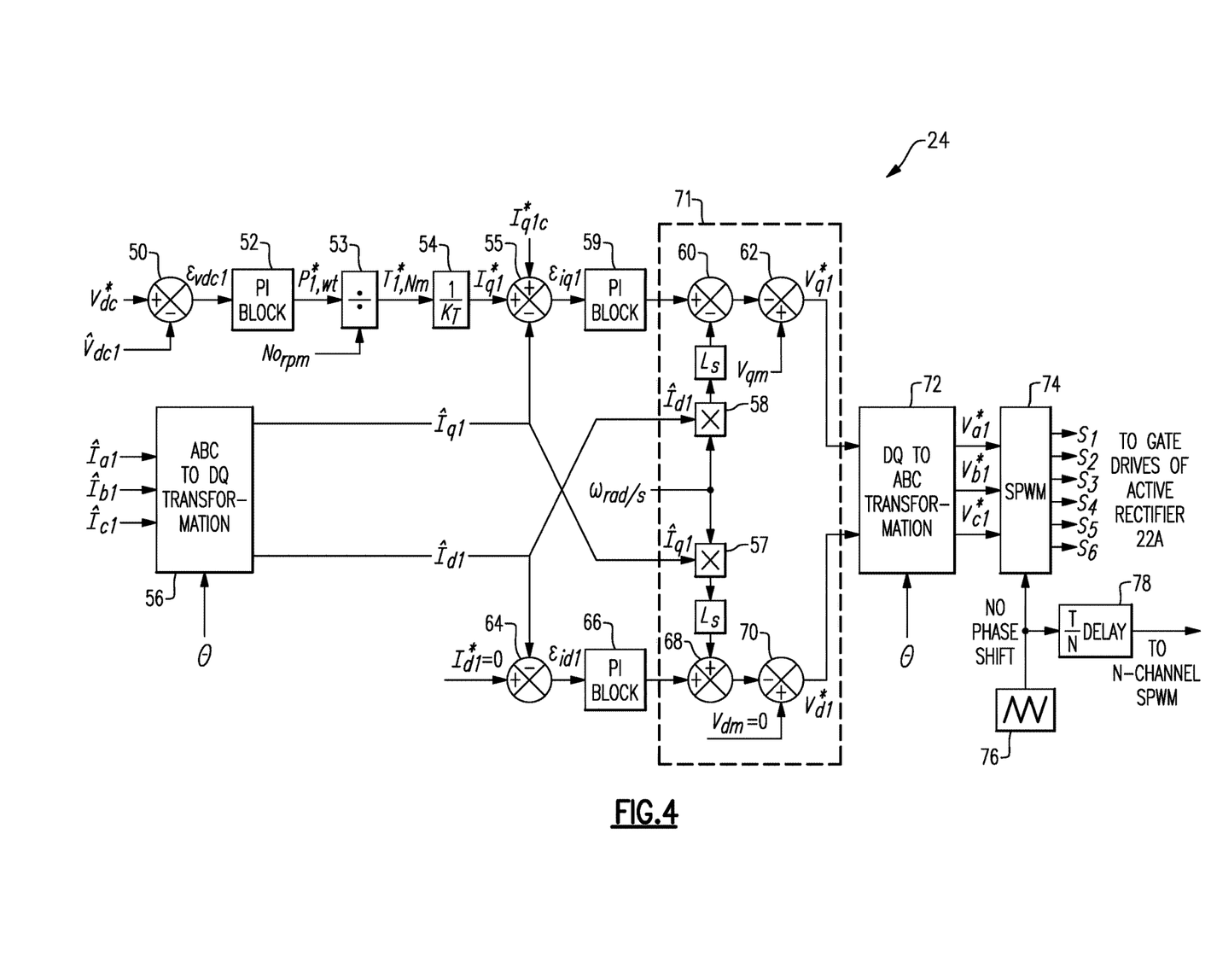
FIG. 4 is a schematic view of an example active rectifier controller.

FIG. 4 is a schematic view of an example active rectifier controller 24 that utilizes the corrective signal discussed above. The active rectifier controller 24 shown in FIG. 4 uses a vector control technique. For the discussion below, the active rectifier controller 24 be discussed in connection with active rectifier controller 24A, which is associated with generator stage 6A and active rectifier 22A. In the discussion below, the ^ symbol represents feedback and/or estimate signals, and the * symbol represents reference signals or commands.

A summer 50 determines a difference between a voltage $V_{dc}^*$ on the DC bus 30 and an output voltage $\hat{V}_{dc1}$ of active rectifier 22A to determine a difference signal $\varepsilon_{vdc1}$ which is input into a proportional integrator (PI) block 52 to determine an amount of power $P_{1,wt}^*$ that is being requested from the active rectifier 22A to support the DC load 18. A divider 53 divides the power value $P_{1,wt}^*$ by a rotational speed $No_{RPM}$ (measured in revolutions per minute "RPM") of the common shaft 8 to determine a torque value $T_{1,Nm}^*$ corresponding to a torque at the generator stage 6 operating speed. A divider 54 divides the torque value $T_{1,Nm}^*$ by a torque constant $k_T$ to obtain a quadrature current value $I_{q1}^*$, which represents a quadrature component of the stator current, and which is input into summer 55.

Individual output currents of the generator stage 6A, $\hat{I}_{a1}$, $\hat{I}_{a2}$, $\hat{I}_{a3}$ and a rotational position θ of the common shaft 8 are input into an ABC to DQ transformation block 56 which performs a transformation from a stationary reference frame to a synchronous reference frame, and outputs a quadrature component current $\hat{I}_{q1}$ and a direct component current $\hat{I}_{d1}$.

The quadrature component current $\hat{I}_{q1}$ is input into summer 55, and is separately multiplied by a rotational speed $\omega_{rad/s}$ of the common shaft 8, using multiplier 57, to obtain gain $L_S$ representing a synchronous inductance of the generator stage 6A, which is input into summer 68.

The direct component current $\hat{I}_{d1}$ is input into summer 64 and is also multiplied by a rotational speed $\omega_{rad/s}$ of the common shaft 8, using multiplier 58, to obtain gain $L_S$ representing a synchronous inductance of the generator stage 6A, which is input into summer 60.

The summer 55 receives quadrature current value $I_{q1}^*$, quadrature component current $\hat{I}_{q1}$, and corrective signal $I_{q1c}^*$ as inputs to determine a difference signal $\varepsilon_{iq1}$, which is input into PI block 59. The output of PI block 59 is input, along with gain $L_S$, representing synchronous inductance, into summer 60. Summer 62 determines a difference between a voltage $V_{qm}$ and the output of summer 60 to determine a quadrature voltage $V_{q1}^*$.

The summer 64 receives direct component current $\hat{I}_{d1}$ and reference direct component current $I_{d1}^*$, which is set to zero to allow operation at near unity power factor, to determine a difference signal $\varepsilon_{id1}$, which is input into PI block 66. The reference direct component $I_{d1}^*$ may also be derived by use of closed loop reactive power control (not shown). The output of PI block 66 is input, along with gain $L_S$, representing synchronous inductance, into summer 68. Summer 70 determines a difference between a voltage $V_{dm}$, which is also set to zero, and the output of summer 68 to determine a direct component voltage $V_{d1}^*$. The summers 60, 62, 68, 70 and multipliers 57, 58 are part of a voltage decoupling block 71 that minimizes a coupling between the DQ current and voltage values.

The DQ voltage values $V_{q1}^*$ and $V_{d1}^*$ are input, along with the rotational position $\theta$ of the common shaft 8, into a DQ to ABC transformation 72 which performs a transformation from the synchronous reference frame back into the stationary reference frame, and outputs target output voltages $V_{a1}^*$, $V_{b1}^*$, and $V_{c1}^*$. The target output voltages are input, along with a carrier signal 76, into a sinusoidal pulse width modulator 74 that provides output commands to the various switches S1A-S6A of the active rectifier 22A.

The carrier signal 76 of the first active rectifier 22A is not phase shifted, but the carrier signal 76 for the remaining N ones of the active rectifiers 22 that are enabled are phase shifted with respect to each other by an amount equal to T/N, where T is a period of the carrier signal 76 and N is a quantity of the active rectifiers 22 that are enabled (see block 78).

The active rectifier controllers 24 for the other generator stages 6 operate in the same fashion, except that they each have their own respective adjustment signal $I_{qc}^*$ and their own respective phase shift.

Figure 5:
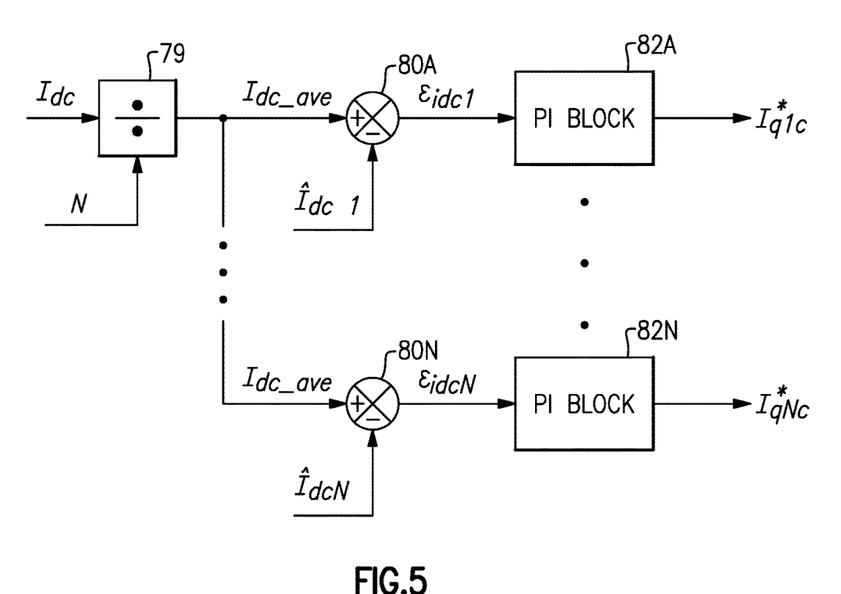
FIG. 5 is a schematic view of an example load sharing controller.
Figure 6:
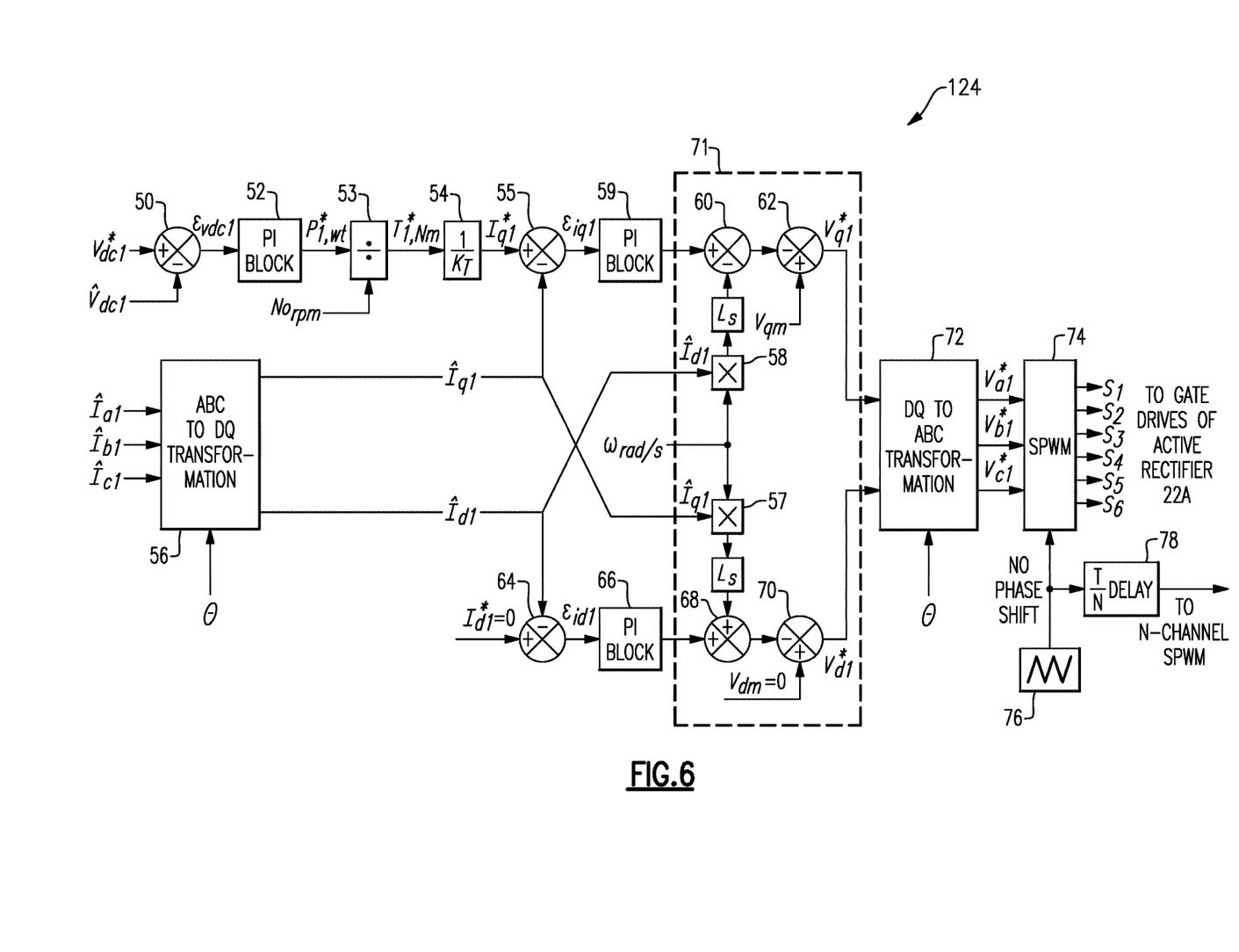
FIG. 6 is a schematic view of another example active rectifier controller.

FIG. 5 is a schematic view of an example load sharing controller 40 that is compatible with the active rectifier controllers 24, and is operable to determine the corrective signals $I_{q1C}^*$ through $I_{q1N}^*$ for the active rectifier controllers 24 of FIG. 6. FIG. 5 illustrates the corrective signal determination feature of the controller 40, but not its fault detection features.

A current $I_{dc}$ on the DC bus 30 is divided by a number N of enabled active rectifiers 22, using divider 79, to determine an average current $I_{dc\_ave}$ provided by each active rectifier 22. For each of the active rectifiers 22, a respective summer 80A-N receives the average current $I_{dc\_ave}$ and a specific current $\hat{I}_{dc}$ output by the active rectifier 22 as inputs, and determines a difference signal $\varepsilon_{idc}$. Using the example of the Nth active rectifier 22A, the specific current is $\hat{I}_{dcN}$ and the difference signal is $\varepsilon_{idcN}$. A respective PI block 82A-N receives the difference signal and determines a respective corrective signal $I_{qc}^*$. For the Nth active rectifier 22, for example, the corrective signal is $I_{qNc}^*$. The respective corrective current signals $I_{qc}^*$ are then provided to the respective active rectifier controllers 24.

FIG. 6 is a schematic view of an example active rectifier controller 124 that provides an alternative configuration to that shown in FIG. 4. In one example, this alternative configuration corresponds to use of a diode in place of contactor C1, as discussed above. Here too, the active rectifier controller 124 will be discussed in connection with active rectifier 22A. Instead of receiving a corrective current signal $I_{q1C}^*$ as an input to summer 55, the active rectifier controller 124 receives a corrective voltage signal $V_{dc1}^*$ into summer 50. Thus, instead of determining a difference between a voltage on the DC bus 30 $V_{dc}^*$ and an output voltage $\hat{V}_{dc1}$ of active rectifier 22A to determine a difference signal $\varepsilon_{vdc1}$, the summer 50 of FIG. 6 instead determines a difference between the corrective voltage signal $V_{dc1}^*$ and the output voltage $\hat{V}_{dc1}$ of active rectifier 22A to determine the difference signal $\varepsilon_{vdc1}$. Also, in the controller 124, summer 55 does not receive the corrective signal. Instead, it is summer 50 that receives the corrective signal. Aside from these differences, the controllers 24, 124 operate in the same manner.

Figure 7:
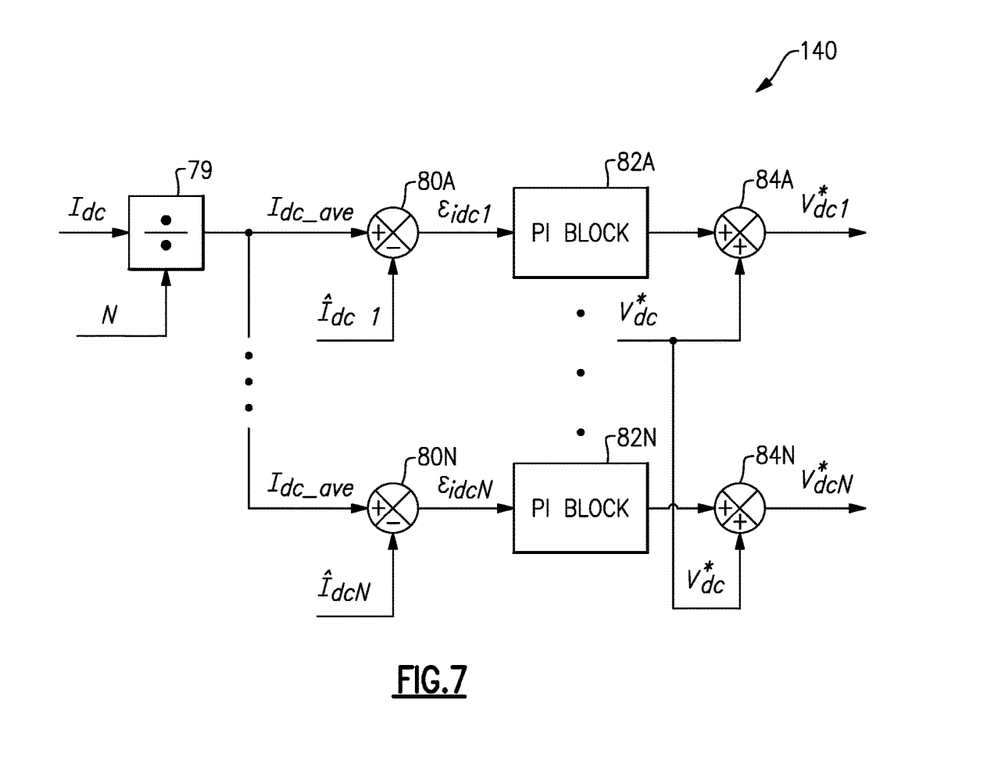
FIG. 7 is a schematic view of another example load sharing controller.

FIG. 7 is a schematic view of an example load sharing controller 140 that is compatible with the active rectifier controllers 124, and is operable to determine the corrective signals $V_{dc1}^*$ through $V_{dcN}^*$ for the active rectifier controllers 124, one of which is depicted in FIG. 6. Here too, the corrective signal determination features of the controller 140 are depicted, but not its fault detection features.

Divider 79 and summers 80A-N operate the same as described above in FIG. 5. In FIG. 7, however, the output of PI blocks 82A-N are provided to respective summers 84A-N. Each summer 84A-N sums the output of its respective PI block 82A-N with the voltage on the DC bus 30 $V_{dc}^*$ to determine a respective corrective voltage signal $V_{dc1}^*$ through $V_{dcN}^*$, which allows for equal load sharing between the active rectifiers 22. The respective corrective voltage signals $V_{dc}^*$ are then provided to the respective active rectifier controllers 124.

Figure 8:
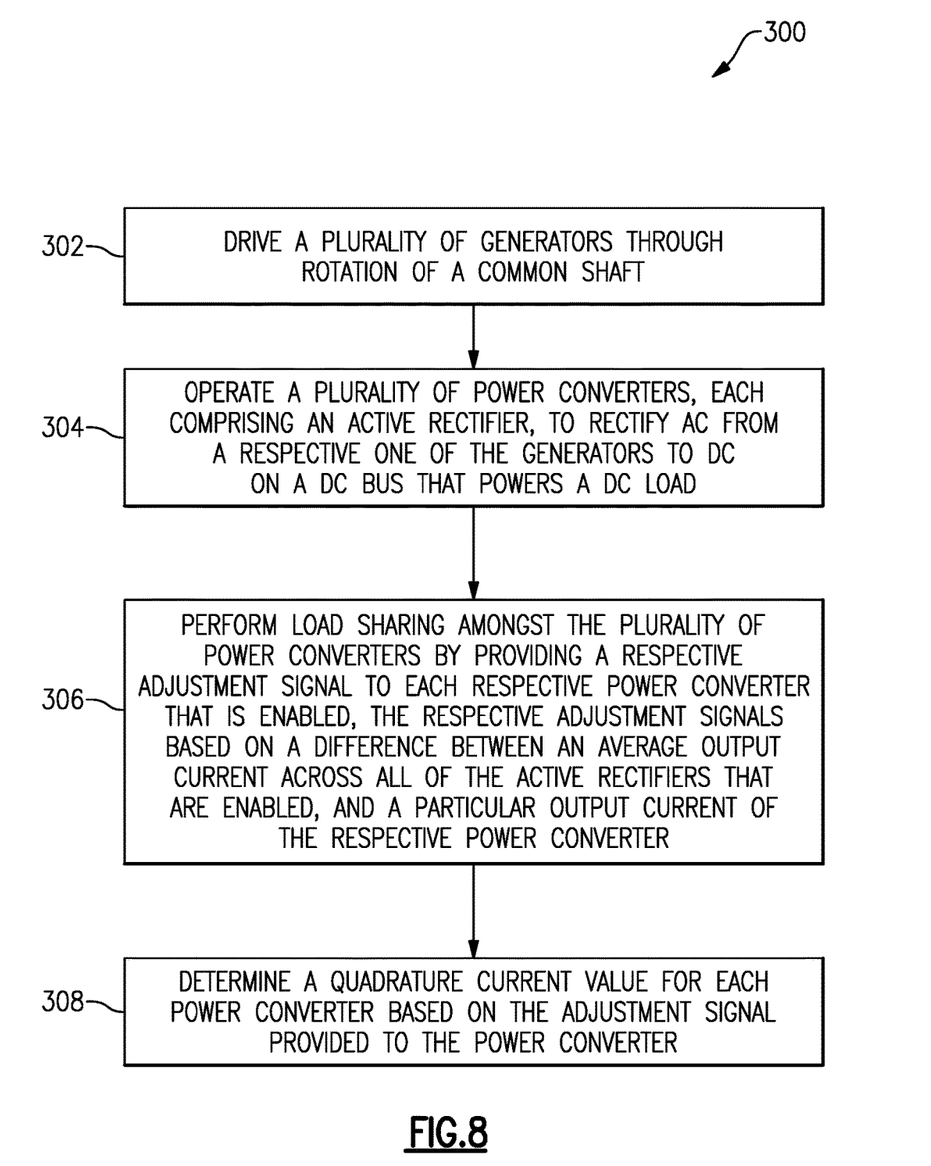
FIG. 8 is flowchart of an example method of operating an electrical power system.

FIG. 8 is a flowchart 300 of an example method of operating an electrical power system 16. A plurality of axial flux generators 6A-N are driven through rotation of a common shaft 8 (block 302). A plurality of power converters 10, each comprising an active rectifier 22, are operated to rectify AC from a respective one of the generators 6 to DC on DC bus 30 that powers a DC load 18 (block 304). Load sharing is performed amongst the plurality of power converters 10 by providing a respective adjustment signal to each respective power converter 10 that is enabled, the respective adjustment signals based on a difference between an average output current across all of the active rectifiers that are enabled, and a particular output current of the respective power converter 10 (block 306). A quadrature current value for each power converter 10 is determined based on the adjustment signal provided to the power converter 10 (block 308).

Referring again to FIG. 2, a rotor position sensor 90, such as a Hall Effect sensor is used to detect a rotational position of the common shaft 8, and its output is communicated on sensing line 92. From this, the rotational speed of the common shaft 8 can be determined. Alternatively, a sensorless technique could be used which includes a state observer that utilizes voltages and currents of the generator stages 6, and a phase locked loop (PLL) to obtain rotor position and velocity. Because such sensorless techniques are understood by those of ordinary skill in the art, they are not discussed at length herein.

Sensing lines 94A-N, each of which are shown schematically and may include a respective set of multiple sensing lines, provides voltage and current output information for each phase of their associated generator stage 6 to their associated active rectifier controller 24. Respective current transducers CT1, CT2, CT3 may be used to obtain the AC current values over sensing lines 94A-N.

Sensing lines 96A-N, each of which are shown schematically and may include a respective set of multiple sensing lines, provides voltage and current values for an output of their associated active rectifier 22 to their associated active rectifier controller 24.

Sensing line 98, which is shown schematically and may include multiple sensing lines, provides voltage and current values for the DC bus 30, after the filter circuit 41, to the load sharing/fault detection controller 40. Current transducer CT4 may be used to obtain AC current values over sensing line 98. The DC bus 30 voltage may be measured across the filter capacitor 48, for example.

A communication bus 100 interconnects the active rectifier controllers 24A-N to controller 40 for sharing information and commands.

The example electrical power system 16 discussed herein provides a number of benefits over prior art systems, including improvements in availability of power delivery, fault tolerance, and overall reliability. By sharing a common output filter 41 among the multiple generator stages 6, the electrical power system 16 can also reduce output filter size over prior art systems.

The electrical power system 16 also enables scalable design through its modular construction, and the fact that the various generator stages 6 can be dynamically enabled and disabled. The load sharing features discussed above accommodate steady-state and dynamic variations in parameters of the multiple generator stages 6 and active rectifiers 22, and improve overall system performance.

Although three phase generator stages 6A-N are described above that include three windings A, B, C and three switching legs 34-36, it is understood that this is only an example and that other quantities of phases could be used if desired (e.g., more than three or less than three).

Although the various generator stages 6A-N have been described as being part of a single modular axial flux generator, it is understood that in some examples the generator stages 6A-N are instead discrete generators that are not part of a single, modular axial flux generator. Also, it is understood that other types of generators can be used that are driven by a common shaft other than axial flux generators.

Also, although example embodiments have been disclosed, a worker of ordinary skill in this art would recognize that certain modifications would come within the scope of this disclosure. For that reason, the following claims should be studied to determine the scope and content of this disclosure.

What is claimed is:

1. An electrical power system comprising:
a direct current (DC) bus connected to a load;
a plurality of generators driven by rotation of a common shaft;
a plurality of power converters, each comprising an active rectifier controller that operates a respective associated one of a plurality of active rectifiers to rectify multiphase alternating current (AC) from a respective associated one of the plurality of generators to DC on the DC bus; and
a load sharing controller operable to provide a respective corrective signal to each respective power converter that is enabled, the respective corrective signals based on a difference between an average output current across all of the active rectifiers that are enabled, and a particular output current of the respective power converter;
wherein each active rectifier controller is operable to determine a quadrature current value for the generator associated with the active rectifier controller based on the corrective signal provided to the power converter of the active rectifier controller, and control the active rectifier associated with the active rectifier controller based on the quadrature current value.

2. The electrical power system of claim 1, comprising:
an output filter situated on the DC bus between the load and a node that connects each of the plurality of active rectifiers that are enabled to the DC bus.

3. The electrical power system of claim 2, wherein the output filter comprises a first filter portion on a positive rail of the DC bus, and a second filter portion on a negative rail of the DC bus, each of the first and second filter portions comprising a first inductor and a second inductor, the first inductor connected in parallel with a resistor between first and second nodes, and the second inductor connected in series to the first node.

4. The electrical power system of claim 1:
wherein the corrective signal comprises a first quadrature current; and
wherein each active rectifier controller is configured to:
determine a second quadrature current based on feedback current values from each phase of the generator associated with the active rectifier controller;
determine a third quadrature current based on a rotational speed of the common shaft and a difference between a DC bus voltage and an output voltage of the active rectifier associated with the active rectifier controller;
determine the quadrature current value based on the first, second, and third quadrature currents; and
determine a target output voltage for the active rectifier associated with the active rectifier controller based on the quadrature current value.

5. The electrical power system of claim 1:
wherein the corrective signal comprises a reference voltage; and
wherein each active rectifier controller is configured to:
determine a first quadrature current based on feedback current values from each phase of the generator associated with the active rectifier controller;
determine a second quadrature current based on a rotational speed of the common shaft and a difference between the reference voltage and an output voltage of the active rectifier associated with the active rectifier controller;
determine the quadrature current value based on the first and second quadrature currents; and
determine a target output voltage for the active rectifier associated with the active rectifier controller based on the quadrature current value.

6. The electrical power system of claim 1, wherein each active rectifier controller is operable to disable the active rectifier associated with the active rectifier controller based on a detected fault condition in the generator associated with the active rectifier controller.

7. The electrical power system of claim 6, wherein to disable the active rectifier associated with the active rectifier controller, the active rectifier controller is configured to disconnect the active rectifier from at least one of a positive rail and a negative rail of the DC bus.

8. The electrical power system of claim 1, wherein each active rectifier controller is operable to:
utilize a carrier signal to perform pulse width modulation on the active rectifier associated with the active rectifier controller; and phase shift the respective carrier signal of the active rectifier controller relative to the other active rectifiers based on a quantity of the power converters that are enabled.

9. The electrical power system of claim 1, wherein the plurality of active rectifiers are connected in parallel to each other on the DC bus.

10. The electrical power system of claim 1, comprising a prime mover engine that rotates the common shaft.

11. The electrical power system of claim 1, wherein each generator is an axial flux permanent magnet generator.

12. A method of operating an electrical power system, comprising:
    driving a plurality of generators through rotation of a common shaft;
    operating a plurality of power converters, each comprising an active rectifier, to rectify multi-phase alternating current (AC) from a respective one of the generators to direct current (DC) on a DC bus that powers a DC load;
    performing load sharing amongst the plurality of power converters by providing a respective corrective signal to each respective power converter that is enabled, the respective corrective signals based on a difference between an average output current across all of the active rectifiers that are enabled, and a particular output current of the respective power converter; and
    determining a quadrature current value for the generator associated with each power converter based on the corrective signal provided to the power converter; and
    controlling each active rectifier that is enabled based on the quadrature current value of the active rectifier.

13. The method of claim 12, wherein the corrective signal comprises a first quadrature current, the method comprising, for each power converter:
    determining a second quadrature current based on feedback current values from each phase of the generator associated with the power converter;
    determining a third quadrature current based on a rotational speed of the common shaft and a difference between a DC bus voltage and an output voltage of the active rectifier associated with the power converter; and
    determining the quadrature current value for the active rectifier of the power converter based on the first, second, and third quadrature currents; and
    determining a target output voltage for the active rectifier of the power converter based on the quadrature current value.

14. The method of claim 13, wherein disabling an active rectifier comprises disconnecting the active rectifier from at least one of a positive rail and a negative rail of the DC bus.

15. The method of claim 12, wherein the corrective signal comprises a reference voltage, the method comprising, for each power converter:
    determining a first quadrature current based on feedback current values from each phase of its associated generator;
    determining a second quadrature current based on a rotational speed of the common shaft and a difference between a the reference voltage and an output voltage of the active rectifier associated with the power converter;
    determining the quadrature current value for the active rectifier of the power converter based on the first and second quadrature currents; and
    determining a target output voltage for the active rectifier of the power converter based on the quadrature current value.

16. The method of claim 12, comprising:
    detecting a fault condition on a given one of the generators; and
    disabling the active rectifier associated with the given generator based on said detecting.

17. The method of claim 12, comprising:
    phase shifting respective pulse width modulation carrier signals of the active rectifiers relative to each other based on a quantity of the active rectifiers that are enabled.

18. The method of claim 17, wherein each power converter comprises a plurality of switching legs, each controlling connection of a respective stator winding of the generator associated with the power converter to the DC bus, the method comprising:
    performing pulse width modulation on the plurality of switching legs based on the carrier signal.

19. The method of claim 12, comprising:
    filtering an output of the plurality of active rectifiers that are enabled through a shared output filter that is situated on the DC bus between the load and the plurality of active rectifiers, the shared filter comprising a first filter portion on a positive rail of the DC bus, and a second filter portion on a negative rail of the DC bus, each of the first and second filter portions comprising a pair of inductors, one of which is connected in parallel with a resistor between first and second nodes, and the other which is connected in series to the first node.

20. The method of claim 12, wherein said driving a plurality of generators through rotation of a common shaft comprises:
    operating a prime mover engine to rotate the common shaft.

* * * * *